(12) United States Patent
Wilson et al.

(10) Patent No.: US 11,750,854 B2
(45) Date of Patent: Sep. 5, 2023

(54) SATELLITE SWITCHING FOR ADDRESSABLE ASSET DELIVERY

(71) Applicant: Invidi Technologies Corporation, Princeton, NJ (US)

(72) Inventors: Daniel C. Wilson, Edmonton (CA); Bruce J. Anderson, Chesterfield, NJ (US)

(73) Assignee: INVIDI TECHNOLOGIES CORPORATION, Princeton, NJ (US)

( * ) Notice: Subject to any disclaimer, the term of this patent is extended or adjusted under 35 U.S.C. 154(b) by 875 days.

(21) Appl. No.: 15/403,847

(22) Filed: Jan. 11, 2017

(65) Prior Publication Data
US 2018/0199079 A1 Jul. 12, 2018

(51) Int. Cl.
*H04N 21/2365* (2011.01)
*H04N 21/2668* (2011.01)
*H04N 21/6543* (2011.01)
*H04N 21/64* (2011.01)
*H04N 21/234* (2011.01)
(Continued)

(52) U.S. Cl.
CPC ... *H04N 21/23424* (2013.01); *H04N 21/2365* (2013.01); *H04N 21/23614* (2013.01); *H04N 21/2668* (2013.01); *H04N 21/26208* (2013.01); *H04N 21/6143* (2013.01);
(Continued)

(58) Field of Classification Search
CPC ............ H04N 21/4331; H04N 21/435; H04N 21/235; H04N 21/812; H04N 21/6143; H04N 21/6543; H04N 21/2668; H04N 21/26208; H04N 21/2365; H04N 21/23614; H04N 21/23424; G06Q 30/02
See application file for complete search history.

(56) References Cited

U.S. PATENT DOCUMENTS 6,704,930 B1 * 3/2004 Eldering .......... H04N 21/25891
725/35
2002/0124182 A1 9/2002 Bacso et al.
(Continued)

FOREIGN PATENT DOCUMENTS

WO 01/26371 A1 4/2001

OTHER PUBLICATIONS

IN253CH2014A "A system to multiplex real-time private commands and private content over live satellite broadcast to facilitate localization of TV channels" to Kotaru et al. (Year: 2015).*
(Continued)

*Primary Examiner* — Nathan J Flynn
*Assistant Examiner* — Caroline Somera
(74) *Attorney, Agent, or Firm* — Davis Graham & Stubbs LLP

(57) ABSTRACT

Specific transmission mechanisms and processes are provided to support real-time addressable asset delivery in satellite broadcast networks including satellite television networks. A satellite network (100) includes a satellite (102) that transmits a satellite transmission (106) to a terrestrial receiver (104), such as a satellite dish. The satellite dish (104) is associated with a UED (108) such as a television with a set top box. The satellite transmission (106) includes a number of MUXs (107). One or more of the MUXs (107) includes a programming channel and associated asset channels. Addressable asset options can be delivered at UEDs by hopping from a programming channel to an asset channel at an asset delivery opportunity.

38 Claims, 8 Drawing Sheets

(51) Int. Cl.
*H04N 21/81* (2011.01)
*H04N 21/61* (2011.01)
*H04N 21/262* (2011.01)
*H04N 21/236* (2011.01)

(52) U.S. Cl.
CPC ....... *H04N 21/6543* (2013.01); *H04N 21/812* (2013.01); *H04N 21/64* (2013.01)

(56) References Cited

U.S. PATENT DOCUMENTS

| | | | |
|---|---|---|---|
| 2002/0144263 A1 | 10/2002 | Eldering et al. | |
| 2004/0244035 A1* | 12/2004 | Wright | H04N 21/44004 725/32 |
| 2005/0015816 A1* | 1/2005 | Christofalo | H04N 21/812 725/35 |
| 2005/0289630 A1 | 12/2005 | Andrews et al. | |
| 2006/0287915 A1* | 12/2006 | Boulet | G06Q 30/0269 705/14.61 |
| 2007/0022032 A1* | 1/2007 | Anderson | G06Q 30/02 705/35 |
| 2009/0074051 A1* | 3/2009 | Manapragada | H04L 65/607 375/240 |
| 2011/0173655 A1* | 7/2011 | Blumenschein | H04N 21/23614 725/35 |
| 2012/0023522 A1* | 1/2012 | Anderson | G06Q 30/0241 725/35 |
| 2012/0060182 A1* | 3/2012 | Hardin | H04N 7/10 725/31 |
| 2017/0019711 A1* | 1/2017 | Feltham | G06Q 30/0269 |

OTHER PUBLICATIONS

International Search Report and Written Opinion, dated Apr. 30, 2018, for Application PCT/US2018/013387.

* cited by examiner

Audience Segment 1

| PC | $V_T$ | Rank | $CPM_1$ | $V_1$ | $Rev_1$ |
|----|-------|------|---------|-------|---------|
| P6 | 900k  | 2    | 20      | 400k  | 8k      |
| P7 | 400k  | 8    | 29      | 100k  | 2.9k    |

Audience Segment 2

| $CPM_2$ | $V_2$ | $Rev_2$ |
|---------|-------|---------|
| 14      | 175k  | 2.45k   |
| 32      | 85k   | 2.72k   |

Audience Segment 3

| PC | $CPM_3$ | $V_3$ | $Rev_3$ |
|----|---------|-------|---------|
| P6 | 18      | 140k  | 2.52k   |
| P7 | 32      | 80k   | 2.56k   |

Audience Segment 4

| $CPM_4$ | $V_4$ | $Rev_4$ | $AC_T$ | AC by Rank | AC by Rev |
|---------|-------|---------|--------|------------|-----------|
| 22      | 75k   | 1.65k   | 4      | 3          | 1         |
| 25      | 75k   | 1.875k  | 4      | 1          | 3         |

FIG. 8

SATELLITE SWITCHING FOR ADDRESSABLE ASSET DELIVERY

FIELD OF THE INVENTION

The present invention relates generally to delivering addressable assets in broadcast networks and, in particular, to delivering addressable assets in satellite networks, including satellite TV networks.

BACKGROUND OF THE INVENTION

After many years of discussion and development, addressable asset delivery systems have recently begun widespread deployment in broadcast television networks, e.g., cable and satellite television networks. In addressable asset delivery systems, different network users receiving the same programming content (e.g., the same television program on the same programming channel) can receive different assets during a given asset delivery opportunity (ADO). In the context of broadcast television, this may involve advertising breaks where certain spots in certain breaks on certain channels may be designated as addressable spots where a default asset can be replaced with an addressable asset selected from a set of asset options.

While this is the most common early implementation of addressable asset delivery in such contexts, many other uses are possible including, for example, addressable asset delivery during on-demand, time-shifted or streaming delivery of television content, addressable product placement advertising within programming, addressable pop-up or crawl content during programming or advertising, addressable public service announcements or other addressable content. The addressable assets selected for delivery at a given user equipment device (UED), such as a television or television with an associated set top box or other equipment, may be based on, for example: actual or estimated demographics of a user or users; location (e.g., an address of the user or current location of the UED); income, purchasing behavior or other financial information of the user or household; user interests or other classification parameters of the user or household. For example, advertisers may specify targeting constraints for ads that correspond to such classification parameters such that an asset having, e.g., the targeting constraints of male, age 21-34 are delivered to a user associated with the classification parameters of male, age 21-34 or otherwise matching the constraints within system definitions.

It will be appreciated that delivering addressable assets is challenging in broadcast networks as such networks are not primarily intended for point-to-point delivery of content to particular UEDs. Two principal types of systems have been deployed to address this issue in broadcast television networks; channel hopping and forward-and-store systems. In channel hopping systems, addressable asset options are transmitted in real-time (that is, in synchronization with a supported ADO) on separate bandwidth such as dedicated asset channels. When an addressable ADO occurs, the UED can re-tune or hop to the bandwidth carrying the appropriate asset and then hop back to the programming bandwidth at the conclusion of the ADO. All of this can occur transparently from the perspective of the user.

In forward-and-store systems, assets are transmitted to and stored at the UED ahead of the ADO. For example, asset options may be broadcast to all UEDs in a network subdivision, and individual UEDs may store appropriate assets. Alternatively, assets may be transmitted via a separate network. In any event, the UED can detect an ADO available for addressable asset delivery, retrieve an asset from storage, and insert the asset into the delivered content stream at the ADO.

Satellite television networks have generally been limited to forward-and-store systems for addressable asset delivery and have not implemented channel hopping. This is generally due to certain limitations that have applied to satellite television networks related to bandwidth limitations and latency associated with re-tuning to alternate bandwidth (e.g., asset channels). Such limitations have made channel hopping impractical. Conversely, many satellite UEDs have had significant storage capacity to support other satellite television network services. Some of that storage has been diverted, in some cases, to support addressable asset delivery. For example, assets may be transmitted during periods of low demand using opportunistically available bandwidth or using specialized transmission technologies such as trickle casting. Satellite television networks have thus achieved some degree of addressable asset delivery.

SUMMARY OF THE INVENTION

It has been recognized that the forward-and-store systems for addressable asset delivery in satellite television networks have certain drawbacks. Among other things, such systems require significant storage capacity at the UEDs, thus increasing costs, limiting deployment, and/or diverting resources that could be used to support other services. Such systems also generally require that the UEDs are capable of asset insertion into the programming stream. In addition, because assets are transmitted ahead of time in forward-and-store systems, in some cases many hours before an ADO, there is limited ability to control what assets are available so as to reflect changing network conditions or values at the time of an ADO. Accordingly, it would be advantageous to support addressable asset delivery in satellite television networks based at least in part on real-time delivery of addressable asset options or channel hopping.

The present invention relates to specific transmission mechanisms and processes to support real-time addressable asset delivery in satellite broadcast networks including satellite television networks. In this regard, satellite network transmissions typically include a number of multiplexes or MUXs within the bandwidth of the transmission. Each MUX includes multiple channels and other data that are combined for transmission and split out at the receiving UED. Under current transmission rates and protocols, at least several channels can be included in each MUX. Moreover, within each MUX, the UED can generally hop, e.g., re-tune or otherwise switch, to another channel, e.g., bandwidth segment or other transmission mechanism within a MUX for delivering a content stream, with minimal latency. Thus, it has been recognized that channel hopping is a viable option for addressable asset delivery in a satellite broadcast network provided that satellite transmission is appropriately configured. Though the present discussion refers to "channel" hopping, programming "channels," and asset "channels," it should be appreciated that the asset options can be delivered by any alternate bandwidth within the MUX in this regard, and references to channels are for convenience and are not intended to limit the bandwidth configuration that may be utilized.

In accordance with one aspect of the present invention, a method and apparatus (utility) is provided for enabling channel hopping in a satellite broadcast network by providing asset options and associated programming in the same MUX of a satellite transmission. The associated utility involves providing, in connection with the satellite broadcast network, a satellite transmission having multiple MUXs where each MUX includes multiple content channels. A first programming channel is provided in a first MUX of the satellite transmission and one or more asset channels are provided in the first MUX of the satellite transmission. The first programming channel includes an ADO occurring in a first time window and each of the asset channels includes an asset in the first time window. In this manner, alternate assets are provided in real-time for selection at the UED.

In accordance with another aspect of the present invention, a satellite transmission is configured to support channel hopping for addressable asset delivery. An associated utility involves identifying a number of programming channels to be supported by addressable assets transmitted in synchronization with ADOs of the programming channels. A satellite transmission is provided that includes multiple MUXs where each MUX includes multiple content channels, e.g., bandwidth for programming and bandwidth for asset options. For each of the designated programming channels, one or more asset channels are provided that have addressable assets in synchronization with an ADO of the corresponding programming channel. The programming channels and asset channels are then inserted into the satellite transmission such that each of the asset channels is included in the same MUX as its corresponding programming channel.

For example, each set of a programming channel and its corresponding asset channels may be included in a different MUX of the satellite transmission and/or multiple sets of programming channels and asset channels may be included in a single MUX. In cases where multiple sets of programming channels and their corresponding asset channels are included in at least one MUX of the satellite transmission, selection logic may be implemented for selecting sets of programming channels with asset channels that will be included in a single MUX. For example, such selection may involve selecting programming channels such that overlap of ADOs will be minimized, selecting programming channels such that the total number of asset channels needed in the event of ADO overlap can be accommodated within the MUX or overflows are minimized, and/or selecting the programming channels such that a quantity, quality or value of asset options that cannot be accommodated in the event of ADO overlap are determined in accordance with defined criteria. In this manner, the total number or value of addressable assets delivered via channel hopping can be maximized within system, network, or bandwidth constraints. Additional addressable assets may be provided via forward-and-store mode. The ADOs supported or assets delivered via channel hopping and forward-and-store modes may be selected based on defined criteria including, for example, the desirability of providing asset options selected in substantially real-time.

In accordance with the still further aspect of the present invention, a utility is provided for operating a UED to provide real-time addressable assets in a satellite broadcast network. An associated utility involves receiving, at the UED of a satellite network, a satellite transmission having multiple MUXs. At least a first MUX of the satellite transmission includes a first programming channel and asset channels that include asset options for an ADO of the first programming channel. The UED further obtains asset selection information concerning a first asset of the asset options to be delivered at the UED at the first ADO of the first programming channel. The UED then detects a first ADO signal indicating an occurrence of the first ADO and tunes the UED from the first programming channel of the first MUX to a selected one of the asset channels of the first MUX responsive to the asset selection information and the first ADO signal. In this manner, the UED can execute channel hopping in a satellite broadcast network context without undue latency associated with the channel hopping.

BRIEF DESCRIPTION OF THE DRAWINGS

For a more complete understanding of the present invention, and further advantages thereof, reference is now made to the following Detailed Description, taken in conjunction with the drawings, in which:

FIG. 8 is a table showing examples of considerations for apportioning asset channels in a MUX.

DETAILED DESCRIPTION

In the following description, the invention is set forth in the context of providing addressable assets in a satellite television network. More specifically, the invention is set forth in the context of providing addressable asset options in connection with advertising breaks of programming channels in a satellite television network. It should be appreciated, however, that the invention is not limited to such contexts. For example, the invention is not limited to any specific satellite broadcast network context or any specific type of ADOs.

Figure 1:
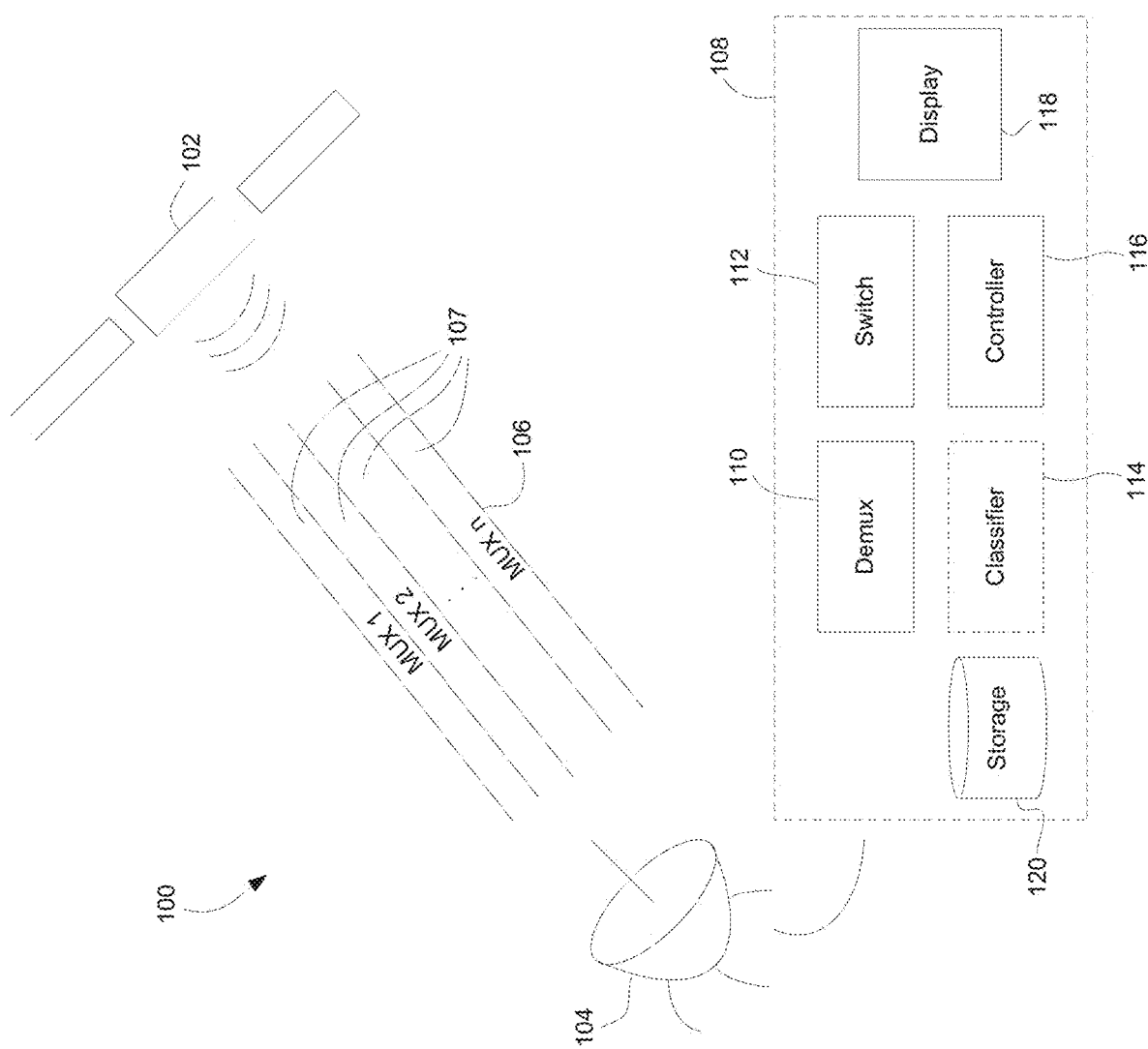
FIG. 1 is a schematic diagram of a satellite network for delivering real-time addressable assets in accordance with the present invention.

Referring to FIG. 1, a schematic diagram of a satellite network 100 is shown. The illustrated network 100 includes a satellite 102 that transmits a satellite transmission 106 to a terrestrial receiver 104, such as a satellite dish. The satellite dish 104 is associated with a UED 108 such as a television with a set top box. Although a single satellite 102, a single receiver 104 and a single UED 108 are shown, it will be understood that the network 100 will generally include multiple satellites 102, multiple receivers 104, and multiple UEDs 108. Moreover, in the network 100, there will not necessarily be a one-to-one correspondence of elements, e.g., a receiver 104 may be associated with multiple UEDs 108.

The illustrated satellite transmission 106 includes a number of MUXs 107. As will be understood from the description below, each of the MUXs 107 may include multiple content channels. Generally, the CPE 108 can demultiplex the MUXs and tune to a particular channel within a particular MUX to display the associated content at the CPE 108. The CPE 108 can typically switch channels within a single MUX by re-tuning without implicating certain analog circuitry and with minimal latency between the command to change channels and execution of the associated channel hop. By contrast, hopping channels between different MUXs 107 takes significant and varying time, e.g., up to multiple seconds, and results in a generally unacceptable latency for purposes of channel hopping to deliver addressable assets. Thus, an important aspect of the present invention relates to configuring the satellite transmission 106 such that asset options are included in the same MUX 107 as the corresponding programming channel. It will be appreciated in this regard that the desired effect can be achieved by providing the asset options in any bandwidth of the same MUX and references to asset channels are not intended to limit implementation to a specific bandwidth configuration within the MUX.

The illustrated UED 108 includes a display device 118 such as a television screen and a controller 116 for controlling delivery of content to be displayed. The controller 116 operates a number of components including, in the illustrated embodiment, a demultiplexer 110, a switch 112, storage 120 and an optional classifier 114. The demultiplexer 110 obtains an electronic representation of the satellite transmission 106 from the receiver 104 and demultiplexes the transmission 106 to provide access to the channels within the transmission 106. In this regard, the processor 116 can process the demultiplexed signal to select or tune to a desired channel of the transmission 106.

The storage 120 provides data storage to support a variety of UED and network services. For example, the storage 120 may provide a DVR functionality and a storage space for preloading video on-demand content so as to reduce downloading latency. In accordance with the present invention, the storage 120 can be used to store asset options in a forward-and-store mode, e.g., to supplement addressable asset delivery via channel hopping. In this regard, asset options may be transmitted when bandwidth is available such as during low network use time periods or by utilizing techniques such as trickle casting. The storage 120 may be implemented as a hard drive or solid state storage and may be statically or dynamically configured to provide storage capacity for different services.

The switch 112, is used to switch between different content streams to be delivered via the display 118. For example, the switch may select real-time content corresponding to the satellite transmission 106 for rendering on the display 118 or delivery of a content stream from storage 120 for rendering on the display 118. In the context of the present invention, the switch 112 in conjunction with the controller 116 may control the UED 108 to provide real-time addressable assets options from the transmission 106 or previously stored addressable asset options from storage 120.

The storage 120 may also store various information for use in controlling addressable asset delivery. For example, various information may be transmitted from a network platform of an addressable asset delivery system to the UED 108 to provide information concerning classification parameters of the UED 108 of a current user or users, information concerning the availability and location within the transmission 106 of asset options for a given ADO, instructions concerning an asset channel to tune to at a given ADO, or the like. Such information may be provided via the transmission 106 or via a separate network connection, such as via the internet. Moreover, such information or portions thereof may be provided as a list in broadcast mode transmitted to multiple UEDs 108 or may be unicast to specific UEDs 108.

In certain implementations, the UED 108 may include a classifier 114. The classifier 114 is operative to provide classification parameters concerning the UED 108 or users thereof that can be matched to targeting constraints for particular addressable asset options. For example, the classification parameters may relate to demographics such as age, gender or income, location associated with the UED or user, purchasing behavior, data network usage behavior, or any other parameters that may be useful in matching the UED 108 or users thereof to assets. In this regard, the classifier 118 may monitor a click stream—e.g., channel selections, the amount of time that a user remains on various channels, volume selections, frequency of channel switches, and like—to continually estimate classification parameters of users. Additionally or alternatively, the classifier 114 may obtain information regarding classification parameters from network platforms and third-party databases. Such a classifier 114 may be used in contexts where metadata defining targeting constraints for particular addressable asset options are provided to the UED 108 for use by the processor 116 in matching to the classification parameters from the classifier 114. Such targeting constraints may be provided via the transmission 106 or via a different transmission pathway.

It will be appreciated that such a classifier 114 is not required and it may be preferred in certain implementations to avoid the need for a classifier 114 so as to reduce the resources required by the UED to implement addressable advertising and simplify deployment. To that end, the UED 108 or user can be matched to a particular asset option at a remote platform of the network. The UED 108 can then be instructed to select the appropriate asset option for an ADO without requiring any matching of classification parameters to targeting constraints at the UED 108.

The classifier 114 and/or controller 116 may also be used to provide information concerning current network conditions. As will be understood from the description below, the number and apportionment of asset channels, the addressable asset options provided, and other operational details may be dependent on the size and composition of current audiences on various programming channels among other things. Some information may be readily available in this regard from program ratings, census data and the like. However, such information may not provide the level of detail desired by asset providers or for system implementation. For example, asset providers may desire to target pet owners or current owners of, e.g., Ford® automobiles, and system operators may desire to estimate or determine the current or projected audience size of such audience segments. Such information may not be accurately determined from any ratings information available for the programming channel of interest or other data sources.

On the other hand, information specific to a current user or users and detailed information may be obtained by a classifier (at the UED or at a network platform), a database of consumer information (e.g., data obtained from a credit agency such as Experian or provided by an asset provider such as Ford Motor Company) or a combination thereof. However, even if such information is obtained, the network operator generally will not know, in a satellite broadcast network, whether a particular UED is powered on, what channel it is tuned to, who is in the current audience, etc., absent some mechanism for obtaining such information. The UED 108 may therefore include a voting utility that provides vote information, for example, periodically, in response to a polling signal, or upon the occurrence of another trigger event.

The content of the vote can vary depending on the specific implementation. In this regard, if the system includes a network-based (not UED-based) classifier or otherwise determines current classification parameters at the network (e.g., based on third-party database information), the vote may simply indicate the current status of the UED (e.g., on or off, current channel and, optionally, whether anyone is present and engaged). If a UED-based classifier is employed, the vote may include current classification parameter values or a vote for one or more asset options that match the current audience (e.g., based on a received list of asset options with targeting constraints). Such voting is described, for example, in U.S. Pat. No. 7,730,509 entitled "Asset Delivery Reporting in a Broadcast Network," issued on Jun. 1, 2010, which is incorporated herein by reference. The votes, as well as any asset option list and related messaging, may be provided via satellite communications, terrestrial data network, wireless network, telephony or other communications pathway.

Figure 2:
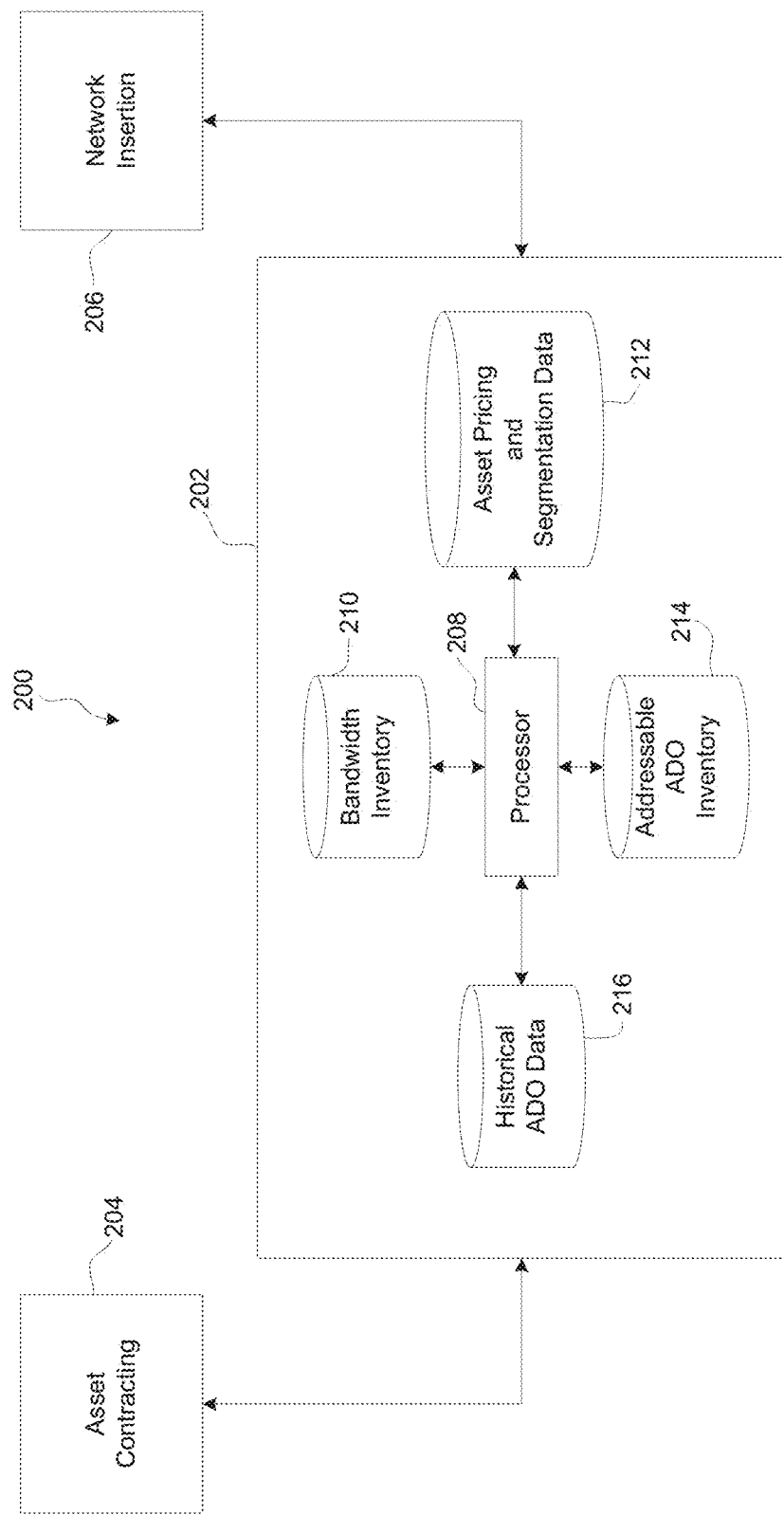
FIG. 2 is a schematic diagram of an addressable asset system in accordance with the present invention.

FIG. 2 is a schematic diagram of an addressable asset delivery system 200 in accordance with the invention. The illustrated system 200 is operative to, among other things, determine a configuration of a satellite transmission to support real-time addressable asset delivery and to generate instructions for controlling UEDs to deliver addressable assets. The illustrated system 200 includes an addressable asset platform 202 that communicates with an asset contracting platform 204 and a network insertion system 206. As will be understood from the description below, the asset contracting platform 204 provides information concerning assets available for delivery to UEDs, targeting campaign parameters for those assets, delivery values, and the like. The network insertion system 206 is operative to configure a satellite transmission to UEDs.

In order to determine how to configure a satellite transmission, the processor 208 of the illustrated platform 202 processes a variety of information concerning the nature of the satellite transmission, the ADOs to be serviced, and the assets that are available to be delivered by the UEDs. Information regarding the nature of the satellite transmission may be provided as bandwidth inventory information 210. For example, the bandwidth inventory information 210 may indicate how many MUXs are included in the satellite transmission, how many channels are available in each MUX, and how many of those channels are available for programming and for addressable asset options, e.g., asset channels. It will be appreciated that the transmission characteristics may change over time. This information may be provided by the network provider, e.g., a satellite television company.

The processor 208 may also access asset pricing and segmentation data 212. For example, the asset pricing and segmentation data 212 may identify what assets are available for specific ADOs, what audience segments are targeted for each of those assets, the size of those audience segments, the value of delivery for the assets (e.g., in terms of cost per thousand impressions or CPM), pacing, frequency or other campaign specifications, and the like. Among other things, this information may be used to apportion asset channels in the event that there are not sufficient asset channels available to accommodate all potential addressable asset deliveries. This data can be provided, for example, by the asset contracting platform 204. The asset contracting platform 204 may be used by asset providers to place orders for addressable asset delivery. The asset provider may specify targeting parameters and campaign specifications as well as setting a price for asset delivery.

The illustrated processor 208 can also access addressable ADO inventory information 214. In many cases, it is anticipated that only certain ADOs on certain programming channels will be designated for delivery of addressable assets. This may be due to bandwidth restrictions and/or business considerations limiting the number of addressable ADOs. The information 214 may thus define the specific ADOs on specific programming channels designated as addressable ADOs. In addition, the information 214 may include the potential value of delivering addressable assets in connection with the various addressable ADOs (e.g., ranking information). For example, these values may be used to determine which ADOs to prioritize for support and how to apportion asset channels as between potentially conflicting ADOs.

The processor 208 may also utilize historical ADO data 216 in connection with configuring a satellite transmission. For example, by analyzing historical ADO data 216 it may be possible to estimate the probability that ADOs on different programming channels will overlap or conflict. Thus, when it is possible to select multiple programming channels for a single multiplex such that the probability of conflicting addressable ADOs is minimized, the bandwidth of the assets channels could be more efficiently utilized to deliver addressable asset options to support the addressable ADOs of those programming channels. Further details regarding how these probabilities can be determined are included in U.S. Pat. Appl. Ser. No. 62/430,729 entitled "Resource Allocation in Communication Networks Using Probability Forecasts," filed on Dec. 6, 2016, which is incorporated herein by reference.

Figure 3:
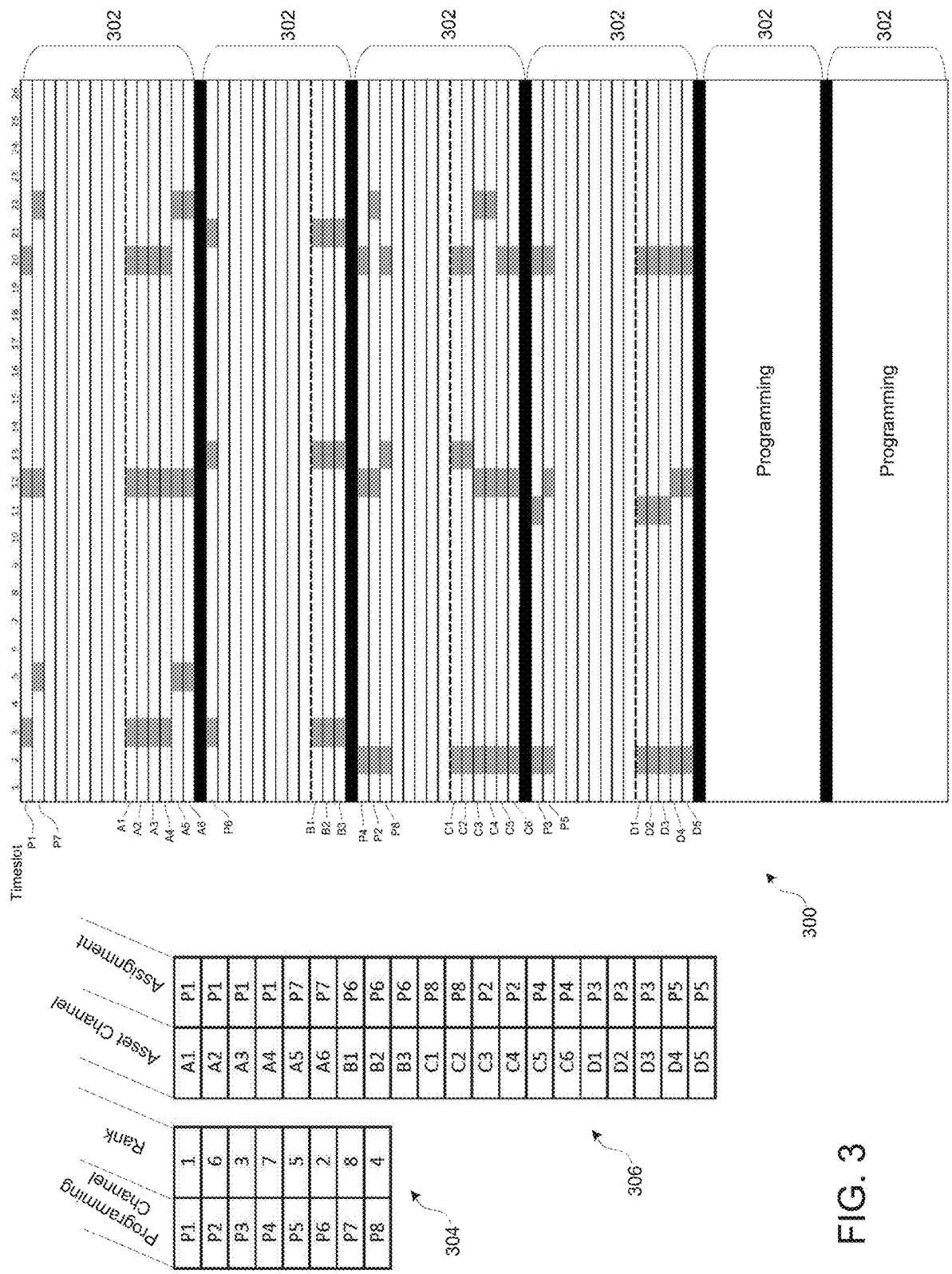
FIGS. 3 and 4 illustrate configurations of a satellite transmission in accordance with the present invention.
Figure 4:
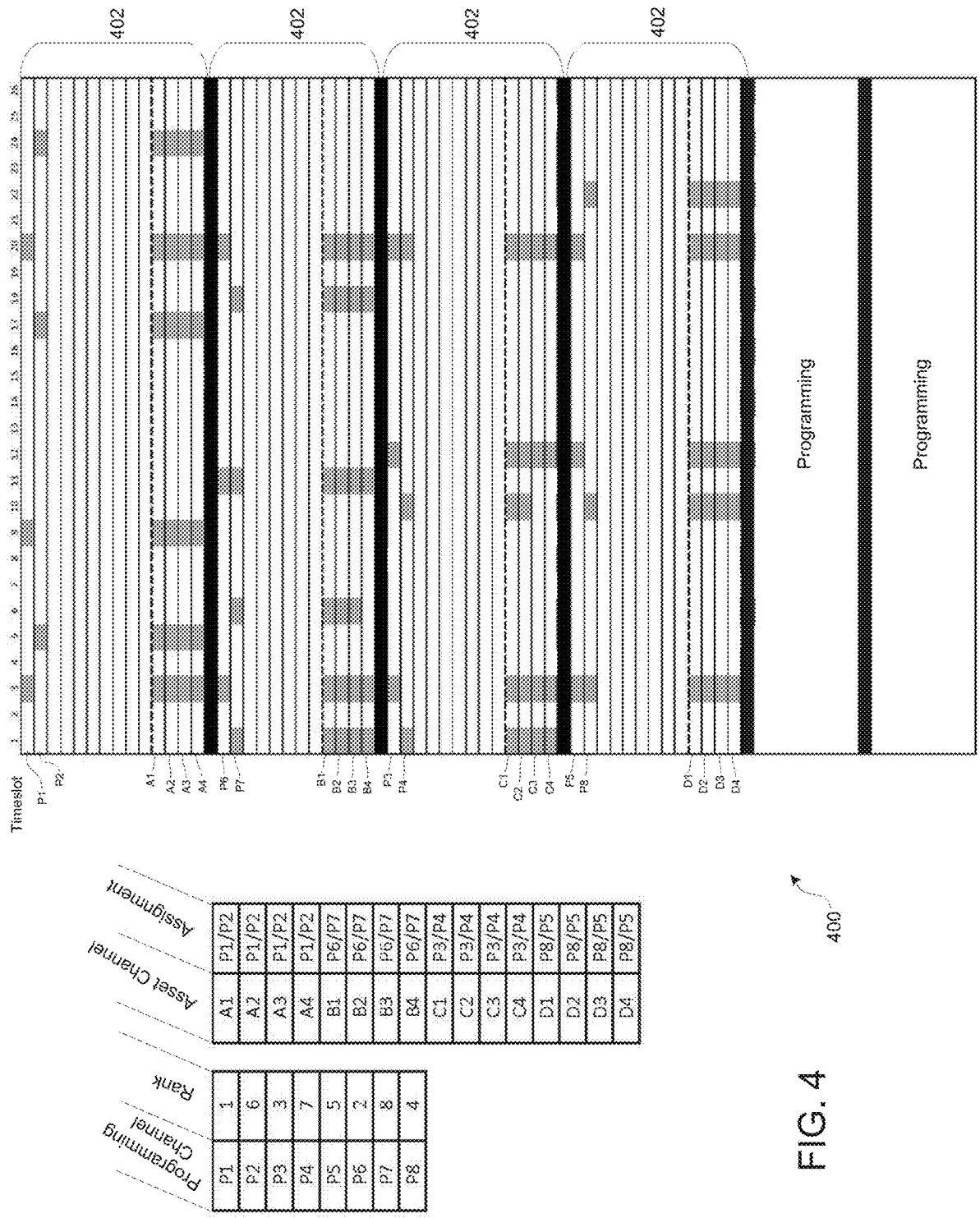

As noted above, the addressable asset delivery system may or may not make use of historical ADO data in determining how to configure a satellite transmission. FIGS. 3 and 4 illustrate alternative implementations in this regard. Referring first to FIG. 3, a process for configuring a satellite transmission without utilizing historical ADO data is illustrated. As shown, a satellite transmission 300 is depicted as including a number of MUXs 302. Each MUX 302 includes a number of content channels that may include programming channels and asset channels. It will not necessarily be the case that all MUXs 302 include both programming channels and asset channels. Thus, for purposes of illustration, in FIG. 3, the upper four MUXs 302 include both programming channels and asset channels whereas the bottom two MUXs 302 include only programming channels. It will be appreciated that this configuration is shown only for purposes of illustration and that an actual satellite transmission may have a different number of MUXs or a different arrangement of programming channels and asset channels. However, it is preferred that the asset channels provided to support a particular ADO of a particular programming channel will be in the same multiplex as the supported ADO.

In the illustrated implementation, the programming channels that include addressable ADOs are assigned to different MUXs 302 based at least in part on a rank. The rankings are shown in table 304. In this case, eight programming channels P1-P8 include addressable ADOs and those programming channels are ranked from 1 to 8 with 1 representing the highest and most valuable ranking. Thus, for example, a programming channel that has the highest ratings or highest potential value of addressable asset delivery for a time window under consideration may be ranked as the highest or most valuable programming channel. In this case, P1 is identified as having the highest rank designated as rank 1. On the other hand, P7 is identified as having the lowest rank.

Table 306 shows asset channel assignments. As noted above, it may be the case that only certain MUXs include asset channels. Moreover, as shown, different MUXs 302 may have a different number of asset channels available, for example, due to bandwidth and business considerations. In the illustrated example, the uppermost MUX 302 includes six asset channels A1-A6; the next MUX 302 includes three asset channels B1-B3; the next MUX 302 includes six asset channels C1-C6; and finally the next MUX 302 includes five asset channels D1-D5.

It may be the case that the highest value or highest rank programming channel should be supported by the most asset channels. Thus, for example, one or more asset providers may wish to provide addressable assets to different audience segments for an ADO associated with a large overall audience share and a network, affiliate or other owner of an ADO may wish to accommodate as many asset channels as possible. However, this will not necessarily be the case. For example, a single asset provider may purchase the entirety of a high value addressable ADO but only wish to place two asset options for that ADO, e.g., based on gender. In the illustrated example, it is assumed that it will generally be desired to provide more asset channels to support addressable ADOs on highly ranked programming channels. Accordingly, as shown in the table 306, the highest rank programming channel, P1, is supported by four asset channels, A1-A4, whereas the lowest rank programming channel, P7, is supported by only two asset channels, A5-A6.

Considerable analysis may be required to develop on optimal configuration of the satellite transmission 300 in this regard. For example, the analysis can be used to determine 1) whether all or only a subset of the programming channels including potentially addressable ADOs will be assigned asset channels, 2) whether more than one such programming channel will be included in one or more of the MUXs 302, 3) when more than one such programming channel will be included in one or more of the MUXs 302, which sets of two or more programming channels should share MUXs, and 4) when more than one such programming channel is included in one or more of the MUXs 302, how the asset channels of that MUX will be apportioned amongst the programming channels.

There are a number of ways that the process of configuring a satellite transmission can be coordinated with contracting for addressable asset delivery. For example, the satellite transmission may be configured prior to contracting with asset providers, e.g., based on historical ratings or pricing information, so that information can be provided to asset providers concerning the likely availability of asset channels for a given ADO. Alternatively, contracting with asset providers may be executed first and then the contract information may be utilized to execute transmission configuration. As a still further alternative, asset providers may contract to purchase a certain number of targeted impressions rather than purchasing specific segments of specific ADOs. In this manner, greater flexibility will be provided to configure satellite transmissions so as to efficiently fulfill campaign specifications.

In the implementation illustrated in FIG. 3, the asset channels are statically assigned to programming channels of the same MUX 302. This is advantageous in that that asset channels are guaranteed to be available when an addressable ADO occurs and supports certain contracting models. However, this will not necessarily make efficient use of the bandwidth associated with the asset channels. Thus, for example, at timeslot twelve of the uppermost MUX 302, each of the programming channels P1 and P7 includes an addressable ADO as indicated by shading and all of the asset channels A1-A6 are utilized during that timeslot. However, at, for example, timeslot three, only programming channel P1 includes an addressable ADO. That addressable ADO is only serviced by four asset channels A1-A4 even though it turns out that all six asset channels A1-A6 were available. It is thus apparent that more efficient use of the asset channels could be achieved if the occurrence of addressable ADOs on different asset channels could be reliably predicted. It should be appreciated that the timeslots are shown for convenience of illustration and ADOs will not necessarily align or not align in binary fashion, e.g., ADOs may partially overlap.

FIG. 4 illustrates an alternate implementation that may be utilized, for example, where historical information is used to identify programming networks that are likely or unlikely to have overlapping ADOs. In this case, the asset channels of each MUX 402 of the satellite transmission 400 can be dynamically assigned to the programming channels of that MUX 402. For example, programming channels P1 and P2 share asset channels A1-A4. Thus, when the addressable ADOs of a single MUX do not overlap, such as the ADO of programming channel P1 at timeslot three, all four of the asset channels A1-A4 can be used to support that ADO. However, where addressable ADOs do overlap, such as the ADOs of the programming channels P6 and P7 at timeslot eleven, the asset channels B1-B4 are shared or apportioned as between programming channels P6 and P7. In this regard, all or a majority of the asset channels B1-B4 may be assigned to the higher ranking programming channel, in this case P6, or the programming channels may be otherwise assigned. It should be noted that it is not necessarily the case that all asset channels will be used in connection with every asset delivery opportunity. For example, in timeslot six, only three asset channels B1-B3 are used to support the addressable ADO of programming channel P7. This may occur, for example, because only three audience segments were sold for that addressable ADO (or four segments if one segment is the default asset including in the programming channel P7).

The satellite transmission configuration process illustrated in FIG. 4 may be used, for example, in connection with implementations where the historical ADO data is utilized to minimize conflicts between addressable ADOs of the same MUX. For example, programming channels P1 and P2 may have been selected for inclusion in the same MUX 402 because historical data indicates that the addressable ADOs of programming channels P1 and P2 rarely coincide. Thus, the process of configuring the satellite transmission 400 involves not only the rank of the programming channels and/or valuations, but also the probability that ADOs will overlap. A processor can be configured to analyze various permutations of programming channel placements and asset channel apportionments to determine a configuration that has the highest value or otherwise satisfies configuration objectives.

However, apportionment of asset channels within a MUX will not necessarily correspond to such rankings. For example, a programming channel with a large overall audience or large potential value may get fewer asset channels than a lower ranked programming channel in the event of conflicting ADOs due to, for example, a lower number of asset options or lower value audience segments. This is illustrated by the table of FIG. 8 that relates to apportioning asset channels (abbreviated AC in FIG. 8) as between programming channels (PC) P6 and P7 of FIG. 4 in the case of conflicting ADOs (e.g., timeslot 11 of FIG. 4). For purposes of this example, it is assumed that four asset options, corresponding to four audience segments (that do not need to be the same for each programming channel) are available for each programming channel for the ADO at issue. Moreover, the default asset included in the programming channel is ignored so that only four asset options are available for the ADO (in reality, the asset with the largest audience may be placed as the default asset in the asset channel for convenience of operation).

In this case, P6 has a total viewership ($V_T$) of 900,000 viewers and a rank of 2, whereas P7 has a total viewership of 400,000 viewers and a rank of 8. However, due to the specific audience breakdowns and pricing (typically expressed in cost per thousand viewers or CPM), three of the asset options for P7 yield higher revenues than the second highest asset option of P6. In this regard, revenues for a particular asset are calculated as:

$$Rev_n = CPM_n \times V_n$$

where: $Rev_n$=revenues for asset option n of a given programming channel;
$CPM_n$=cost per thousand viewers for asset option n; and
$V_n$=viewership for asset option n.

Viewership is preferably determined via voting, but may be estimated based on ratings, historical data for previous ADOs or the like. CPM may be negotiated, determined by auction or other suitable technique. Viewership may be limited to real-time viewers or may include other viewers (e.g., DVR and VOD viewers) within a defined timeframe, e.g., within seven days. In the case of DVR viewers, the system may be configured to record an asset from a selected asset channel or to replace the default asset on playback, e.g., using a stored asset.

FIGS. 4 and 8 suggest one sequence for satellite signal configuration. First, the number of MUXs in a satellite signal, the number of MUXs that will include asset channels, and the number of asset channels that are available in those MUXs may be determined. This may involve a variety of businesses and technology considerations of the network provider, programming networks, asset providers and other stakeholders. Some of these considerations may have little or nothing to do with addressable asset delivery. However, at least the number of MUXs including asset channels and the number of asset channels available in the various MUXs may be determined based on consideration of the demand for and potential value of addressable ADOs.

Next, the number of programming channels for which addressable ADOs will be supported, and the placement of these programming channels into the available MUXs may be determined. This may involve consideration of average or ADO specific viewership, average or per audience segment values, probability of conflicting ADOs, premiums paid for guaranteed access, etc. Finally, in the event of a conflict, asset channels may be shared or apportioned based on ranking, revenues or other considerations (e.g., priority of an asset provider or need to fulfill specifications of a campaign near expiration). Such appointment may be predetermined in anticipation of potential conflicts or determined at the time a conflict becomes apparent. Moreover, based on analysis of historical ADO data and asset values, asset channels that are available at the initiation of an ADO may be withheld to support an expected, potentially overlapping ADO.

Figure 5:
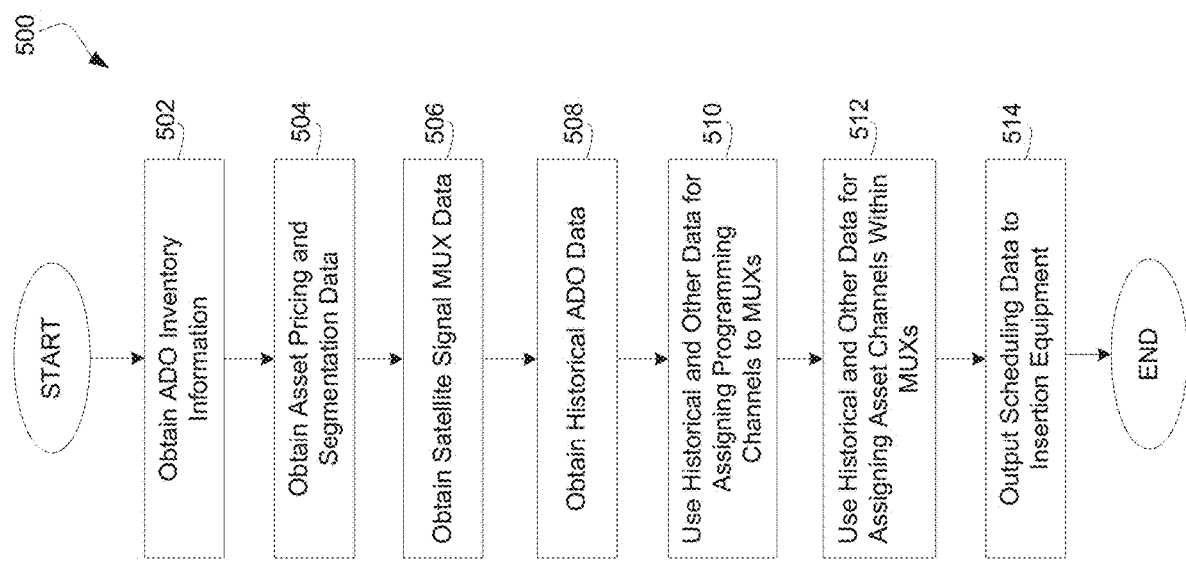
FIGS. 5-7 are flowcharts illustrating processes for delivering addressable assets in a satellite broadcast network in accordance with the present invention.

FIG. 5 is a flowchart illustrating a process 500 for configuring satellite transmission. The process 500 is initiated by obtaining (502) ADO inventory information. The ADO inventory information may identify particular addressable ADOs that are available in connection with particular programming channels. The system also obtains (504) asset pricing and segmentation data. As noted above, this information may be obtained from a contracting platform and provides pricing data, e.g., in terms of CPM, for various audience segments available for addressable asset delivery.

The system may also obtain (506) satellite signal MUX data. In some cases, the satellite network provider may identify how many MUXs are available for a time window under consideration, how many of those MUXs will include asset channels, and how many asset channels each of those MUXs will include. It will be appreciated that this may be an iterative process where, for example, the number of asset channels made available depends on the potential value of addressable asset delivery.

The system may also obtain (508) historical ADO data. As noted above, the ADO data can be used for a variety of purposes including configuring a satellite transmission so as to minimize overlaps or conflicts of addressable ADOs. In some cases, the timing of a particular addressable ADO may be well-defined where as in others it will be less well-defined. This historical data may be used to apportion asset channels as between programming channels in a single MUX or may be used to reserve asset channels if it is anticipated that a higher value addressable ADO opportunity is imminent.

The historical ADO data and other data may then be used (510) for assigning programming channels to MUXs. In some cases, only a single programming channel may be assigned to each MUX that includes asset channels. In other cases, as noted above, more than one programming channel including addressable ADOs may be included in a single MUX. In the latter regard, the historical ADO data and other data may be used (512) to assign asset channels within MUXs. As discussed above, such assignments may be static or dynamic. Once a configuration for the satellite transmission has been determined, that information can be output (514) to an insertion platform to execute appropriate channel assignments.

Figure 6:
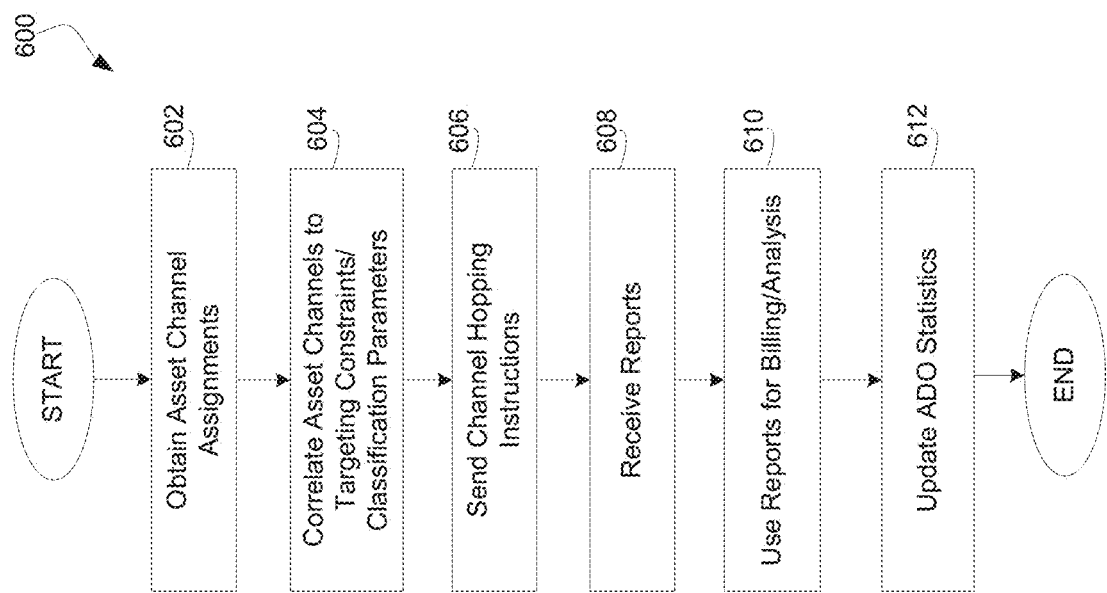

The addressable asset system may also assign audience segments to particular asset channels. The associated process 600 is illustrated in FIG. 6. The illustrated process is initiated by obtaining (600) asset channel assignments. Thus, as described above, a particular programming channel may have particular asset channels assigned to it for a particular addressable ADO. Such assignments may be static or dynamic. For example, for a particular addressable ADO of a particular programming channel, four asset channels may be available for delivering addressable asset options.

The asset channels may then be correlated (604) to targeting constraints and/or classification parameters. For example, a total of five different audience segments may be available for potential delivery of addressable assets in connection with a given addressable ADO. If three asset channels are available to service that addressable ADO, then four addressable assets may be delivered in connection with the ADO (one on each of the asset channels plus one default asset inserted into the programming channel at the ADO). Accordingly, four of the five potential audience segments may be serviced with addressable assets. One of the audience segments, e.g., the lowest value segment, may not be serviced with real-time asset options for that addressable ADO. For example, the one audience segment that is not serviced by real-time addressable assets may receive an addressable asset delivered to the UED via a forward-and-store mode or simply may not be serviced for that ADO.

Individual UEDs or individual users of UEDs may then be matched to the targeting constraints. For example, if the targeting constraints indicate that a particular addressable asset should be delivered to males age 21-34 or to a Ford owner, user information may be accessed to match addressable assets to corresponding UEDs or current viewers of UEDs. Thus, for example, a list identifying UEDs, e.g., by MAC address, to tune to a particular asset channel for a particular ADO may be generated.

Appropriate channel hopping instructions can then be sent (606) to UEDs. For example, the channel instructions may be included in metadata that is broadcast to all UEDs via the satellite transmission. Alternatively, the channel hopping instructions may be sent to UEDs by other mechanisms. For example, the channel hopping instructions may be unicast to individual UEDs via the internet or another network. In many cases, the network will not know ahead of time what programming channel a particular UED will be tuned to at a particular ADO. Accordingly, the channel hopping instructions may encompass all programming channels that the UED could be tuned to.

After an addressable ADO or periodically, the system may receive (608) reports concerning asset delivery. As noted above, in many cases, the system will not know what programming channel a UED is tuned to or, indeed, whether the UED is powered on. Thus, the UEDs may generate reports (or a subset of the UEDs may generate reports) to provide information concerning asset delivery. The reports may include additional information such as cases where the user tuned away from the asset during the ADO or fast-forwarded through the ADO (in the case of time shifted consumption or on-demand consumption). The reports can be used (610) for billing and analysis. For example, the reports may indicate the total audience size for a particular asset so that the asset provider can be billed accordingly. In addition, information such as concerning tune-aways may be used to analyze asset effectiveness or other behavior of interest. Finally, the ADO statistics may be updated (612) based on the reports. This may involve analyses to determine when addressable ADOs are likely to occur on particular programming networks as well as likely audience size and delivery value.

Figure 7:
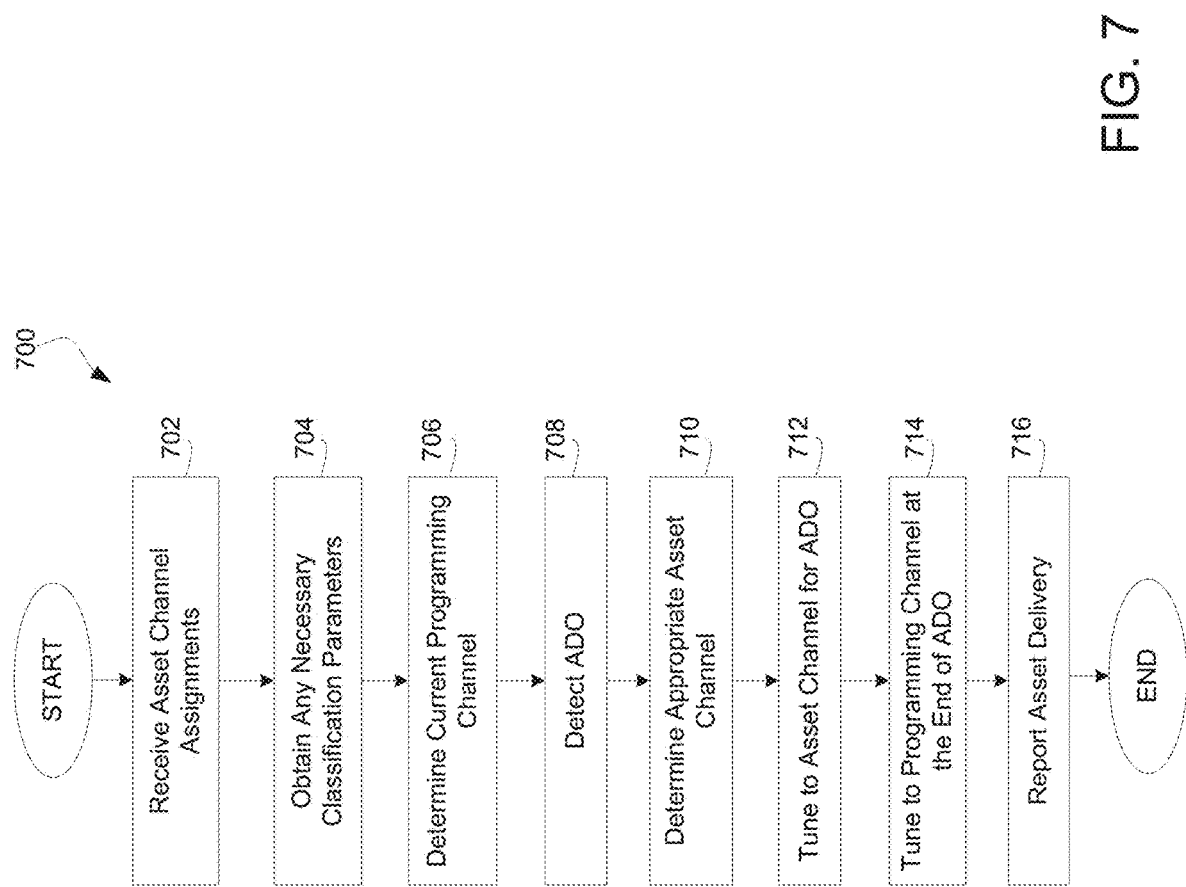

FIG. 7 is a flowchart that illustrates a process 700 that may be executed by a UED in connection with addressable asset delivery. The process 700 is initiated by receiving (702) asset channel assignments. As noted above, such information may be broadcast or unicast to the UED. In the case where the information is broadcast, the UED can review the information to ascertain which channel hopping information is applicable to that UED. In the case of unicast information, the UED may obtain channel hopping information specifically directed to that UED and encompassing one or more addressable ADOs for one or more programming channels.

The UED can then obtain (704) any necessary classification parameters. As noted above, in some implementations, the UED will simply be directed as to what asset channel to tune to for an addressable ADO. In other cases, the UED may receive information indicating targeting constraints for particular asset options associated with particular asset channels. In such cases, the UED may access locally determined or otherwise obtained classification information for the UED or current user or users. The classification information can then be matched, at the UED, to the targeting constraints to select an asset channel for a particular addressable ADO.

In any event, the UED may determine (706) a current programming channel. Particular asset channels may be assigned to particular programming channels for a given addressable ADO. Determining the correct asset channel to tune to therefor depends on knowing the current programming channel. The system may access this information from the UED or programming channel information may be included in an ADO signal such as a cue message preceding an addressable ADO.

The UED can then detect (708) an ADO. For example, a cue message may be provided a short time, e.g., seconds or fractions of a second, prior to an ADO. The cue message may be contained in the programming stream or in metadata associated with the programming stream. The UED can determine (710) the appropriate asset channel for that ADO. As discussed above, the UED may be specifically instructed what asset channel to tune to for a particular addressable ADO or may match targeting constraints to classification parameters to select an appropriate asset channel. The UED can then tune (712) to the asset channel for the ADO and tune (714) to the programming channel at the end of the ADO. Preferably, this channel hopping is transparent from the perspective of the user. The UED may also monitor a click stream or other information relative to the ADO to identify tune-aways, fast-forward events, likelihood of user presence during the ADO, muting, or other indications of consumption and engagement. Asset delivery information can then be reported (716) to the system. As noted above, the reports may identify the asset delivered, the programming channel in connection with which the asset was delivered, the time of asset delivery, and other information concerning consumption and engagement.

The foregoing description of the present invention has been presented for purposed of illustration and description. Furthermore, the description is not intended to limit the invention to the form disclosed herein. Consequently, variations and modifications commensurate with the above teachings, and skill and knowledge of the relevant art are within the scope of the present invention. The embodiments described herein above are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The invention claimed is:

1. A method for use in providing addressable assets in a satellite broadcast network, comprising:
    providing, in connection with said satellite television network, a satellite transmission, from a satellite source to a terrestrial receiver, having multiple multiplexes (MUXs) where each MUX includes multiple content channels;
    inserting a first programming channel in a first MUX of said satellite transmission;
    inserting another programming channel in another MUX of said satellite transmission; and
    inserting one or more first asset channels in said first MUX of said satellite transmission, said asset channels including asset options for one or more programming channels;
    said first programming channel having an asset delivery opportunity occurring in a first time window and each of said first asset channels including an asset in said first time window.

2. A method as set forth in claim 1, further comprising:
    inserting a second programming channel in a second MUX of said satellite transmission the same as or different than said first MUX; and
    inserting one or more second asset channels in said second MUX of said satellite transmission;
    said second programming channel having an asset delivery opportunity occurring in a second time window and each of said second asset channels including an asset in said second time window.

3. A method as set forth in claim 1, wherein said first programming channel and said first asset channels define a first set of a group of channel sets, and said satellite transmission further includes a plurality of additional sets of said group of channel sets, each of said additional sets including a programming channel and one or more asset channels inserted in the same MUX, said satellite transmission being configured such that said group of channel sets are distributed across multiple MUXs of said satellite transmission.

4. A method as set forth in claim 3, wherein a distribution of said group of channel sets across said satellite transmission is based at least in part on a number of asset channels available in each of said MUXs.

5. A method as set forth in claim 3, wherein a distribution of said group of channel sets across said satellite transmission is based at least in part on a priority of each programming channel for support by asset channels.

6. A method as set forth in claim 5, wherein said priority is based on at least one of an audience size and a value of asset delivery for each said programming channel.

7. A method as set forth in claim 3, wherein at least two channel sets of said group of channel sets are inserted into the same MUX.

8. A method as set forth in claim 7, wherein each of the asset channels of each of said two channel sets is statically assigned to a respective one of said two channel sets.

9. A method as set forth in claim 8, wherein a number of asset channels of each one of said two channel sets is determined based at least in part on a priority of said each one of said two channel sets for support by asset channels.

10. A method as set forth in claim 9, wherein said priority is based on at least one of an audience size and a value of asset delivery for said each one of said two channel sets.

11. A method as set forth in claim 7, wherein said at least two channel sets share at least one shared asset channel.

12. A method as set forth in claim 11, wherein said shared asset channel supports asset delivery opportunities of each of said two channel sets when said asset delivery opportunities occur at different times.

13. A method as set forth in claim 11, wherein said shared asset channel supports an asset delivery opportunity of a selected channel set of said two channel sets when asset delivery opportunities of said two channel sets overlap.

14. A method as set forth in claim 13, wherein said selected channel set is selected based at least in part on a priority of said each one of said two channel sets for support by asset channels.

15. A method as set forth in claim 14, wherein said priority is based at least in part on at least one of an audience size and a value of asset delivery for said each one of said two channel sets.

16. A method as set forth in claim 14, wherein said priority is based at least in part on feedback concerning current network conditions.

17. A method as set forth in claim 11, wherein said shared asset channel is assigned to one of said two channel sets for a time period based at least in part on historical data concerning a probability of an asset delivery opportunity occurring in said time period.

18. A method as set forth in claim 7, wherein said two channel sets are selected based at least in part on a priority of each channel set of said group of channel sets for support by asset channels.

19. A method as set forth in claim 7, wherein said two channel sets are selected based at least in part on historical data concerning a probability of overlap of asset delivery opportunities of said two channel sets.

20. An apparatus for use in providing addressable assets in a satellite broadcast network, comprising:
a transmitter for providing, in connection with said satellite television network, a satellite transmission, from a satellite source to a terrestrial receiver, having multiple multiplexes (MUXs) where each MUX includes multiple content channels; and
a controller, operatively associated with said transmitter, for:
inserting a first programming channel in a first MUX of said satellite transmission;
inserting another programming channel in another MUX of said satellite transmission;
inserting one or more first asset channels in said first MUX of said satellite transmission;
said first programming channel having an asset delivery opportunity occurring in a first time window and each of said first asset channels including an asset in said first time window.

21. An apparatus as set forth in claim 20, wherein said controller is further operative for:
inserting a second programming channel in a second MUX of said satellite transmission the same as or different than said first MUX; and
inserting one or more second asset channels in said second MUX of said satellite transmission;
said second programming channel having an asset delivery opportunity occurring in a second time window and each of said second asset channels including an asset in said second time window.

22. An apparatus as set forth in claim 20, wherein said first programming channel and said first asset channels define a first set of a group of channel sets, and said satellite transmission further includes a plurality of additional sets of said group of channel sets, each of said additional sets including a programming channel and one or more asset channels inserted in the same MUX, said satellite transmission being configured such that said group of channel sets are distributed across multiple MUXs of said satellite transmission.

23. An apparatus as set forth in claim 22, wherein a distribution of said group of channel sets across said satellite transmission is based at least in part on a number of asset channels available in each of said MUXs.

24. An apparatus as set forth in claim 22, wherein a distribution of said group of channel sets across said satellite transmission is based at least in part on a priority of each programming channel for support by asset channels.

25. An apparatus as set forth in claim 24, wherein said priority is based on at least one of an audience size and a value of asset delivery for each said programming channel.

26. An apparatus as set forth in claim 22, wherein at least two channel sets of said group of channel sets are inserted into the same MUX.

27. An apparatus as set forth in claim 26, wherein each of the asset channels of each of said two channel sets is statically assigned to a respective one of said two channel sets.

28. An apparatus as set forth in claim 27, wherein a number of asset channels of each one of said two channel sets is determined based at least in part on a priority of said each one of said two channel sets for support by asset channels.

29. An apparatus as set forth in claim 28, wherein said priority is based on at least one of an audience size and a value of asset delivery for said each one of said two channel sets.

30. An apparatus as set forth in claim 26, wherein said at least two channel sets share at least one shared asset channel.

31. An apparatus as set forth in claim 30, wherein said shared asset channel supports asset delivery opportunities of each of said two channel sets when said asset delivery opportunities occur at different times.

32. An apparatus as set forth in claim 30, wherein said shared asset channel supports an asset delivery opportunity of a selected channel set of said two channel sets when asset delivery opportunities of said two channel sets overlap.

33. An apparatus as set forth in claim 32, wherein said selected channel set is selected based at least in part on a priority of said each one of said two channel sets for support by asset channels.

34. An apparatus as set forth in claim 33, wherein said priority is based at least in part on at least one of an audience size and a value of asset delivery for said each one of said two channel sets.

35. An apparatus as set forth in claim 33, wherein said priority is based at least in part on feedback concerning current network conditions.

36. An apparatus as set forth in claim 30, wherein said shared asset channel is assigned to one of said two channel sets for a time period based at least in part on historical data concerning a probability of an asset delivery opportunity occurring in said time period.

37. An apparatus as set forth in claim 26, wherein said two channel sets are selected based at least in part on a priority of each channel set of said group of channel sets for support by asset channels.

38. An apparatus as set forth in claim 26, wherein said two channel sets are selected based at least in part on historical data concerning a probability of overlap of asset delivery opportunities of said two channel sets.

* * * * *